US010387363B2

(12) United States Patent
Cha et al.

(10) Patent No.: US 10,387,363 B2
(45) Date of Patent: Aug. 20, 2019

(54) MULTIPURPOSE ADAPTER CARD AND INTEGRATION METHOD THEREFOR

(71) Applicant: KOREA INSTITUTE OF SCIENCE & TECHNOLOGY INFORMATION, Daejeon (KR)

(72) Inventors: Kwangho Cha, Daejeon (KR); Junglok Yu, Hwaseong-si (KR); Sangwan Kim, Daejeon (KR); Sichul Kim, Gunpo-si (KR); Sungho Kim, Daejeon (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 29 days.

(21) Appl. No.: 15/831,404

(22) Filed: Dec. 5, 2017

(65) Prior Publication Data
US 2018/0239737 A1   Aug. 23, 2018

(30) Foreign Application Priority Data
Feb. 21, 2017   (KR) ........................ 10-2017-0023013

(51) Int. Cl.
*G06F 13/40*   (2006.01)
*G06F 13/42*   (2006.01)

(52) U.S. Cl.
CPC ...... *G06F 13/4291* (2013.01); *G06F 13/4045* (2013.01); *G06F 13/4282* (2013.01); *G06F 2213/0026* (2013.01)

(58) Field of Classification Search
CPC ............. G06F 13/4291; G06F 13/4045; G06F 2213/0026
See application file for complete search history.

(56) References Cited

U.S. PATENT DOCUMENTS 8,516,290 B1    8/2013  Thomas
9,619,245 B1 *  4/2017  Ramanujam .......... G06F 9/4416
(Continued)

FOREIGN PATENT DOCUMENTS

JP    2000-010912 A    1/2000
JP    2016-526716 A    9/2016
(Continued)

OTHER PUBLICATIONS

Kisti, SC16, The International Conference for High Performance Computing Networking, Storage and Analysis. Nov. 2016.
(Continued)

*Primary Examiner* — Ernest Unelus
*Assistant Examiner* — Ronald T Modo
(74) *Attorney, Agent, or Firm* — Park, Kim & Suh, LLC

(57) ABSTRACT

Disclosed herein is a multipurpose adapter card including a PCIe (Peripheral Component Interconnect express) switching module configured to set a function of the multipurpose adapter card; a first function setting module configured to transmit information on a register value to be referred to by the PCIe switching module to the PCIe switching module; and a second function setting module configured to transmit a function change signal corresponding to preconfigured information to the PCIe switching module, wherein the function of the multipurpose adapter card is extended connection between a host and an external device or connection between a plurality of hosts, wherein the information on the register value and the preconfigured information are information on the function of the multipurpose adapter card, wherein the PCIe switching module changes the function of the multipurpose adapter card based on the information on the register value or the function change signal.

10 Claims, 7 Drawing Sheets

(56) References Cited

U.S. PATENT DOCUMENTS

2009/0268743 A1* 10/2009 Chang ................. G06F 13/4045
370/401
2016/0248535 A1* 8/2016 Larikova ............. H04J 14/0212

FOREIGN PATENT DOCUMENTS

| KR | 10-2002-0005830 A | 1/2002 |
| KR | 10-2009-0130850 A | 12/2009 |
| KR | 10-2013-0136469 A | 12/2013 |
| KR | 20-2016-0001743 U | 5/2016 |

OTHER PUBLICATIONS

Korean Notice of Allowance in Appln. No. 10-2017-0023013 dated Jul. 25, 2017 with English translation.

* cited by examiner

US 10,387,363 B2

MULTIPURPOSE ADAPTER CARD AND INTEGRATION METHOD THEREFOR

This application claims the benefit of Korean Patent No. 10-2017-0023013, filed on Feb. 21, 2017, which is hereby incorporated by reference as if fully set forth herein.

DESCRIPTION

Technical Field

The present invention relates to a multipurpose adapter card and a method for integrating the multipurpose adapter card.

Background Art

Peripheral Component Interconnect Express (PCIe) switching processors have evolved to extend the I/O bus, which was limited to the inside of the computer system, to allow connection of devices using the I/O bus outside the computer system. In particular, as the functions of PCIe switching processors have become more diverse, it is becoming possible to utilize the PCIe switching processors for interconnect networking for connecting one server to another as well as for connection of external devices.

The conventional PCIe adapter card is developed and utilized for a specific purpose, and is mainly used for expansion for connecting external devices. However, there is no technology that implements a single PCIe adapter card that may be used for host-to-host connection, that is, interconnect networking, as well as extended connection of external devices.

DISCLOSURE

Technical Problem

An object of the present invention devised to solve the problem lies in a single PCIe adapter card incorporating PCIe adapter cards having different functions and a method thereof.

Technical Solution

The object of the present invention can be achieved by providing a multipurpose adapter card including a peripheral component interconnect express (PCIe) switching module configured to set a function of the multipurpose adapter card, a first function setting module configured to transmit information on a register value to be referred to by the PCIe switching module to the PCIe switching module, and a second function setting module configured to transmit a function change signal corresponding to preconfigured information to the PCIe switching module, wherein the function of the multipurpose adapter card is extended connection between a host and an external device and connection between a plurality of hosts, wherein the information on the register value and the preconfigured information are information on the function of the multipurpose adapter card, wherein the PCIe switching module changes the function of the multipurpose adapter card based on the information on the register value or the function change signal.

In another aspect of the present invention, provided herein is a method for integrating a multipurpose adapter card, the method including transmitting, to a peripheral component interconnect express (PCIe) switching module, information on a register value to be referred to by the PCIe switching module or a function change signal corresponding to preconfigured information, receiving, by the PCIe switching module, the information on the register value or the function change signal, and changing, by the PCIe switching module, the function of the multipurpose adapter card, wherein the first function is a function of connection between a host and a device, and the second function is a function of connection between a plurality of hosts, wherein the function of the multipurpose adapter card is extended connection between a host and an external device or connection between the plurality of hosts, wherein the information on the register value and the preconfigured information are information on the function of the multipurpose adapter card, wherein the PCIe switching module changes the function of the multipurpose adapter card based on the register value or the function change signal.

Advantageous Effects

The present invention may be easily extended to various functions including function switching to device connection or interconnect networking.

Further, the multipurpose adapter card according to the present invention may easily switch between functions, and therefore costs required to separately fabricate cards for individual functions may be eliminated.

Further, the present invention facilitates expansion through connection of a plurality of adapter cards through an optical module.

Further, the present invention may enhance convenience of cabling through the optical module.

BEST MODE

One embodiment of the present invention will be described in detail with reference to the accompanying drawings. In the following description of the present invention, a detailed description of known functions and configurations incorporated herein will be omitted when it may obscure the subject matter of the present invention.

Figure 1:
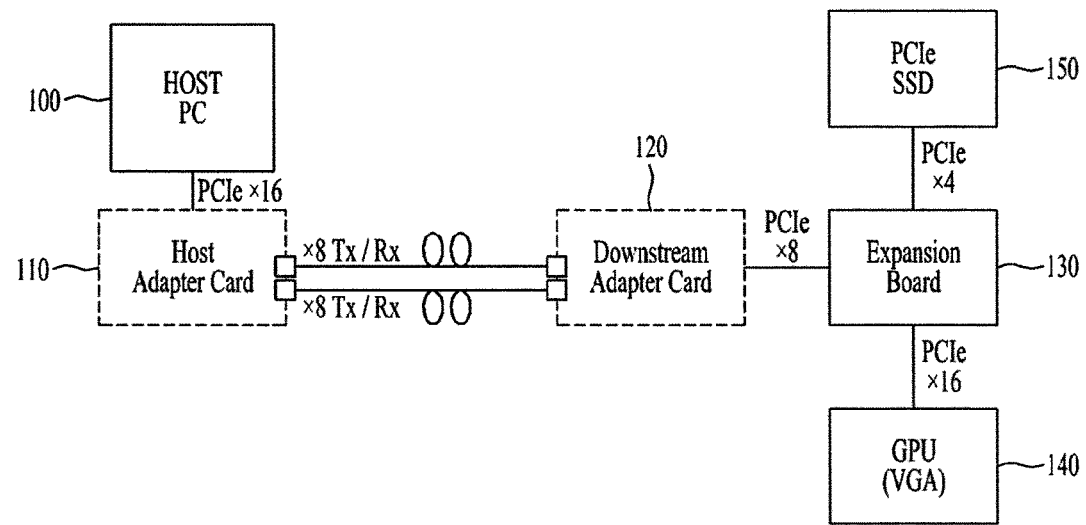
FIG. 1 is a diagram illustrating an embodiment of a PCIe adapter card for expansion of external devices.

FIG. 1 is a diagram illustrating an embodiment of a PCIe adapter card for expansion of external devices.

FIG. 1 illustrates a configuration in which devices mounted on an external expansion board 130 are connected through an I/O expansion function. Specifically, a PCIe SSD (Solid State Drive) 150 or a GPU (Graphics Processing Unit) 140, which is an external device, may be connected through the external expansion board 130. The external expansion board 130 described above may be connected to a downstream adapter card 120. The downstream adapter card 120 may be connected to a host PC 100 through connection with a host adapter card 110.

Figure 2:
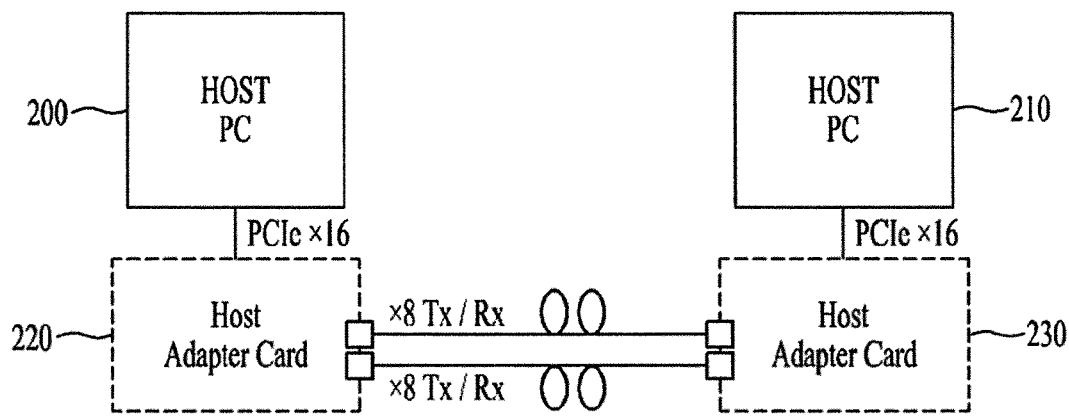
FIG. 2 is a diagram illustrating an embodiment of a PCIe adapter card for interconnect networking.

FIG. 2 is a diagram illustrating an embodiment of a PCIe adapter card for interconnect networking.

FIG. 2 illustrates a configuration in which host PCs are connected through a server-to-server connection, that is, an I/O expansion function. Specifically, a first host PC 200 may be connected to a first host adapter card 220. The first host adapter card may be connected to a second host adapter card 230. The second host adapter card described above may be connected to a second host PC 210.

The adapter card is an element that is essential for connection between host PCs or connection between a host PC and an external device. The configuration of the adapter card may vary depending on whether the adapter card is for I/O expansion, host-to-host interconnection, host-side connection (upstream), or device-side connection (downstream).

As described above, to implement connection between host PCs or connection between a host PC and an external device, separate adapter cards having different uses are required. However, the present invention enables connection between host PCs or connection between a host PC and an external device with a single adapter card through setting of a DIP switch, which will be described later.

Figure 3:
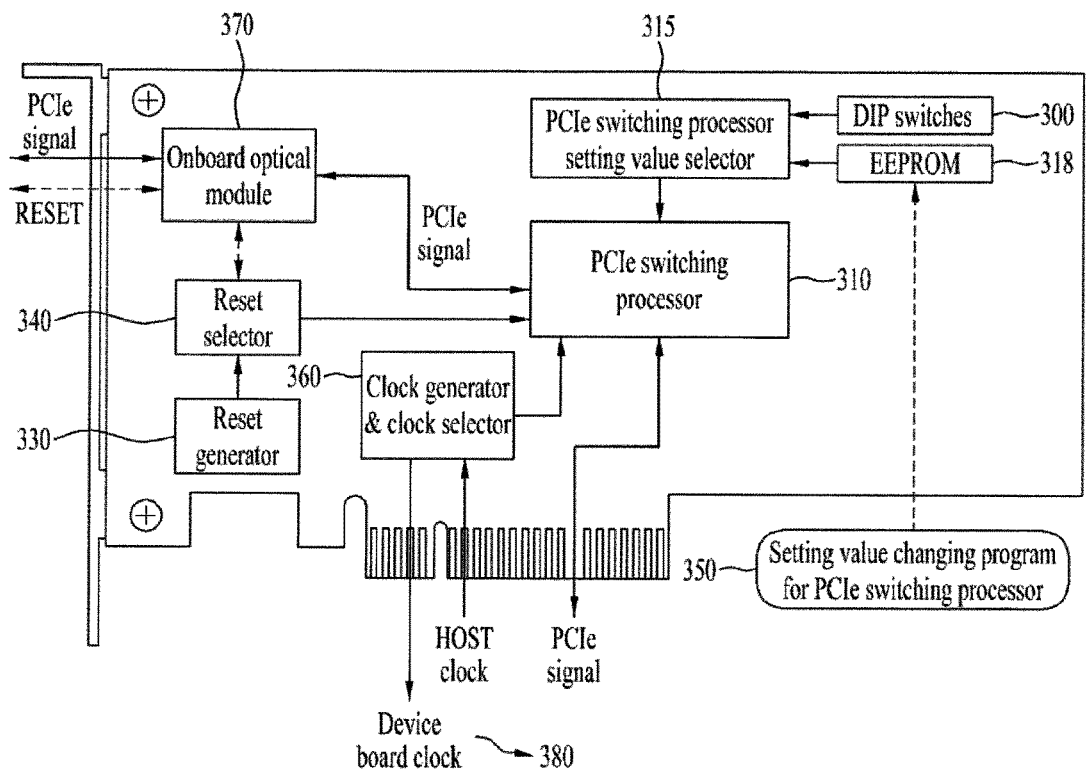
FIG. 3 is a diagram illustrating an embodiment of a single PCIe adapter card according to the present invention.

FIG. 3 is a diagram illustrating an embodiment of a single PCIe adapter card according to the present invention.

Referring to FIG. 3, in order to utilize a single PCIe adapter card for multiple purposes, a change of PCIe adapter card setting corresponding to the purpose of use may be needed. Changing the PCIe adapter card setting as described above may include changing the register value to be referred to by a PCIe switching processor 310 or receiving a changed register value.

A PCIe switching processor setting value selector 315 may receive a register value to be referred to from an EEPROM (Electrically Erasable Programmable Read-Only Memory) 318 or selectively receive a function change signal of the single PCIe adapter card from the DIP switch.

The PCIe switching processor 310 may receive the register value or the function change signal selected through the PCIe switching processor setting value selector 315.

In addition, the PCIe switching processor 310 may transmit and receive a PCIe signal to and from an onboard optical module 370, the device side, or the host side. The PCIe switching processor 310 may also receive a RESET signal or a clock signal.

The EEPROM 318 may record and store each piece of register information (setting values) to be referred to by the PCIe switching processor 310 described above. In addition, the EEPROM 318 may store the changed information for each piece of the above-described register information (setting values) through a setting value changing program 350 for the PCIe switching processor or change each piece of the register information through the setting value changing program 350 for the PCIe switching processor. The EEPROM 318 may also transmit the above-described register information to the PCIe switching processor setting value selector 315. The manner of changing each piece of the above-described register information is not limited to that described above, but the design thereof may be changed in accordance with the designer's intention.

In order to change the setting of the PCIe adapter card, the function of the single PCIe adapter card may be configured by utilizing the DIP switch 300 in addition to the above-described technique of changing the register value. That is, the DIP switch 300 may change the PCIe adapter card setting according to preconfigured information. The DIP switch 300 may transmit information about the PCIe adapter card setting (PCIe adapter card function) to the PCIe switching processor setting value selector 315.

Table 1, which will be described below, describes the above-described predetermined information, that is, a specific function corresponding to each DIP switch 300.

TABLE 1

| DIP Switch Name | Main Function |
| --- | --- |
| Mode | The host side (host mode) or the device side (downstream mode) can be selected for the adapter card to be used. |
| REFCLK | A reference clock provided by the host or a reference clock generated by the adapter card can be selected as a clock signal to be used for the adapter card. |
| RESET Input | The RESET signal to be used for the adapter card can be determined to be one of a RESET signal provided by the host side, a RESET signal transmitted from the optical module, or a RESET signal generated by the adapter card. |
| RESET Output | The RESET signal can be received and transmitted through a slot. Whether to use the RESET signal through the slot as input or output can be selected, and whether or not to use NT RESET signal can also be selected |
| NT Port | NT0 or NT1 port, which is an NTB (Non-Transparent Bridge) port, can be selected, and the NT port can be selected as Disable. |
| Upstream Port | A port to be used as the Upstream port can be selected from among the PCIe switching processor ports. |
| Data Rate | Gen1, Gen2, or Gen3 can be selected as the data rate of the PCI Express bus to be used. |
| Port Config | Allows change of the port configuration of the PCIe switching processor. In the case of an 8x adapter card, the optical module side is set to two 8x ports. In the case of a 16x adapter card, one 16x port can be assigned. |

The PCIe switching processor setting value selection unit 315 may selectively receive information about the PCIe adapter card setting change from the EEPROM 318 or the DIP switch 300 described above and transmit the information to the PCIe switching processor 310. The onboard optical module 370 may connect a plurality of PCIe adapter cards. That is, the onboard optical module 370 may receive a PCIe signal from the PCIe switching processor 310 and transmit (communicate) the same through optical communication. The onboard optical module 370 may convert the PCIe signal into an optical signal and transmit the optical signal.

In addition, in order to utilize a single PCIe adapter card for multiple purposes, the PCIe adapter card may include a clock signal generation function 360 and a RESET signal generation function 330, 340 as well as the PCIe adapter card setting change described above. Details will be described with reference to FIGS. 4 and 5 later.

Figure 4:
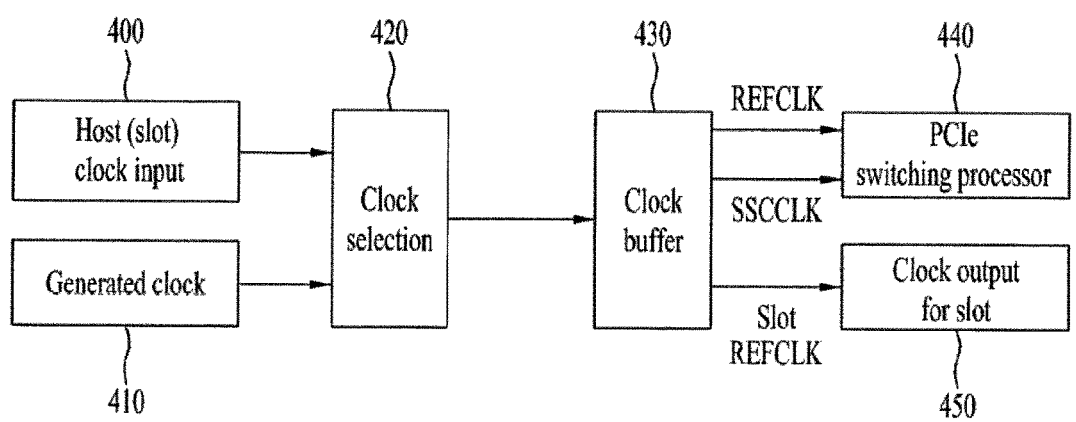
FIG. 4 illustrates an embodiment of a clock signal configuration diagram according to the present invention.

FIG. 4 illustrates an embodiment of a clock signal configuration diagram according to the present invention.

Referring to FIG. 4, the clock signal configuration diagram may correspond to the clock generator and the clock selector (clock signal generation function) 360 described above with reference to FIG. 3. If the single PCIe adapter card according to the present invention is mounted on an apparatus such as a device expansion board in which system clock information does not exist, the clock generator 360 described in FIG. 3 included in the single PCIe adapter card may generate clock information 410. The clock generator 360 may transmit the generated clock information to the PCIe switching processor. The single PCIe adapter card may operate based on the received clock information.

On the other hand, when the single PCIe adapter card according to the present invention is mounted on the host (server) side, the PCIe switching processor 310 may receive system clock information 400 from the host. In addition, the single PCIe adapter card may operate based on the received system clock information. However, even when the single PCIe adapter card according to the present invention is mounted on the host (server) side, the clock generator 360 described above may generate clock information 410.

The clock selection module 420 may select the system clock information 400 or the clock information 410 and transmit the selected clock information to a clock buffer 430. The clock buffer 430 may transmit the selected clock information (the system clock information 400 or the clock information 410) to the PCIe switching processor 440 or provide an output 450 of clock information for a slot. The output 450 for the slot clock described above may correspond to the device board clock 380 described above with reference to FIG. 3. The above-described clock buffer 430 may be omitted depending on the designer's intention. That is, the clock selection module 420 may directly transmit the selected clock information to the PCIe switching processor 440 or directly output 450 the same as clock information for the slot.

Figure 5:
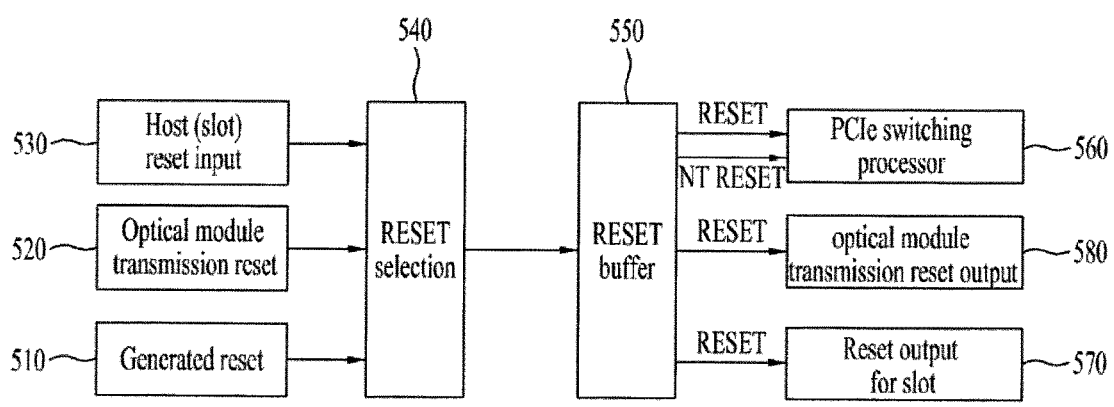
FIG. 5 illustrates an embodiment of a RESET signal configuration diagram according to the present invention.

FIG. 5 illustrates an embodiment of a RESET signal configuration diagram according to the present invention.

Referring to FIG. 5, the RESET signal configuration diagram may correspond to the RESET generator 330 or the RESET selector 340 described above with reference to FIG. 3. The RESET selection module 540 may correspond to the RESET selector 340 described above with reference to FIG. 3.

When the single PCIe adapter card according to the present invention is mounted on an apparatus such as a device expansion board in which system clock information does not exist, the RESET generator 330 of FIG. 3 included in the single PCIe adapter card may generate RESET information (a RESET signal) 510. The PCIe switching processor 310 may receive the generated RESET information 510.

On the other hand, if the single PCIe adapter card according to the present invention is mounted on the host (server) side, the PCIe switching processor 310 may receive host RESET information (a RESET signal) 530 provided from the host. However, even when the single PCIe adapter card according to the present invention is mounted on the host (server) side, the RESET generator 330 described above may generate the RESET information 510.

The RESET selection module 540 may select the host RESET information 530 or the RESET information 510 and transmit the same to the RESET buffer 550. The RESET buffer 550 may transmit the selected RESET information (the host RESET information 530 or the RESET information 510) to the PCIe switching processor 560 or output the same as RESET information 570 for the slot. The RESET buffer 550 described above may be omitted depending on the designer's intention. That is, the RESET selection module 540 may directly transmit the selected RESET information to the PCIe switching processor 560 or directly output the same as the RESET information 570 for the slot.

When the host (server) performs an operation such as rebooting or system initialization, the single PCIe adapter card may initialize the whole system by transmitting RESET information to the devices connected to the host. To this end, the RESET selection module 540 may receive RESET information from the onboard optical module 370 described above with reference to FIG. 3.

The RESET selection module 540 may transmit the RESET information received from the onboard optical module 370 to a RESET buffer 550. The RESET buffer 550 may output the RESET information as optical module transmission RESET information 580. The RESET buffer 550 described above may be omitted depending on the designer's intention. That is, the RESET selection module 540 may directly output the RESET information as the optical module transmission RESET information 580.

The RESET selection module 540 may transmit the RESET information to the onboard optical module 370. Upon receiving the RESET information, the onboard optical module 370 may transmit RESET information to the first PCIe adapter card or the second PCIe adapter card.

Figure 6:
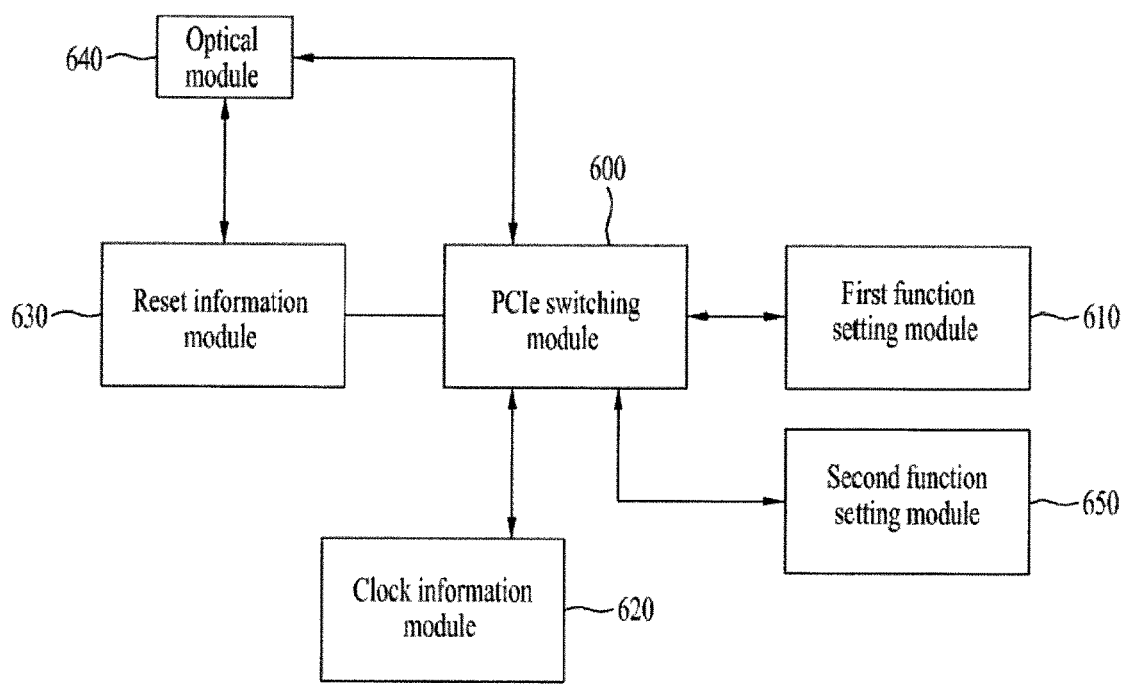
FIG. 6 illustrates an embodiment of a multipurpose adapter card according to the present invention.

FIG. 6 illustrates an embodiment of a multipurpose adapter card according to the present invention.

Referring to FIG. 6, the multipurpose adapter card includes a PCIe (Peripheral Component Interconnect Express) switching module 600, a first function setting module 610, a second function setting module 650, a clock information module 620, a reset information module 630 and an optical module 640. The PCIe switching module 600, the first and second function setting modules 610 and 650, the clock information module 620, the reset information module 630 and the optical module 640 may be implemented by respective hardware processors thereof or may be implemented by one integrated processor.

The PCIe (Peripheral Component Interconnect Express) switching module 600 may correspond to the PCIe switching processor 310 or the PCIe switching processor setting value selector 315 described above with reference to FIG. 3. The first function setting module 610 may correspond to the EEPROM 318 described above with reference to FIG. 3. The second function setting module 650 may correspond to the DIP switch 300 described above with reference to FIG. 3. The clock information module 620 may correspond to the clock generator and the clock selector (clock signal generation function 360) described above with reference to FIG. 3. The reset information module 630 may correspond to the RESET generator 330 or the RESET selector 340 described above with reference to FIG. 3. The optical module 640 may correspond to the onboard optical module 370 described above with reference to FIG. 3.

The PCIe (Peripheral Component Interconnect express) switching module 600 may change the functions of the multipurpose adapter card. The functions of the multipurpose adapter card described above may include external device expansion or interconnect networking. In addition, the PCIe switching module 600 may change the functions of the multi-purpose adapter card based on the information on the register value, which will be described later, or based on a function change signal, which will be described later. The above-mentioned register value and preconfigured information may include information on the functions of the multipurpose adapter card. In addition, the PCIe switching module 600 may selectively receive information on a register value or a function change signal.

The first function setting module 610 may transmit information on a register value to be referred to by the PCIe switching module to the PCIe switching module. The second function setting module 650 may transmit a function change signal corresponding to the preconfigured information to the PCIe switching module.

The clock information module 620 may receive clock information from the outside or may generate clock information. The clock information module 620 may also transmit the generated clock information to the PCIe switching module 600 when the function of the target adapter card is to extend external devices. In addition, when the function of the multipurpose adapter card is interconnect networking, the clock information module 620 may transmit clock information received from the outside to the PCIe switching module 600.

The reset information module 630 may receive reset information from the outside. The reset information module 630 may generate reset information on its own. In addition, the reset information module 630 may transmit the generated information to the PCIe switching module 600 when the function of the multipurpose adapter card is to extend to external devices. When the function of the multi-purpose adapter card is interconnect networking, the reset information module 630 may transmit the reset information received from the outside to the PCIe switching module 600. The optical module 640 may connect a plurality of adapter cards (the first adapter card and the second adapter card).

Figure 7:
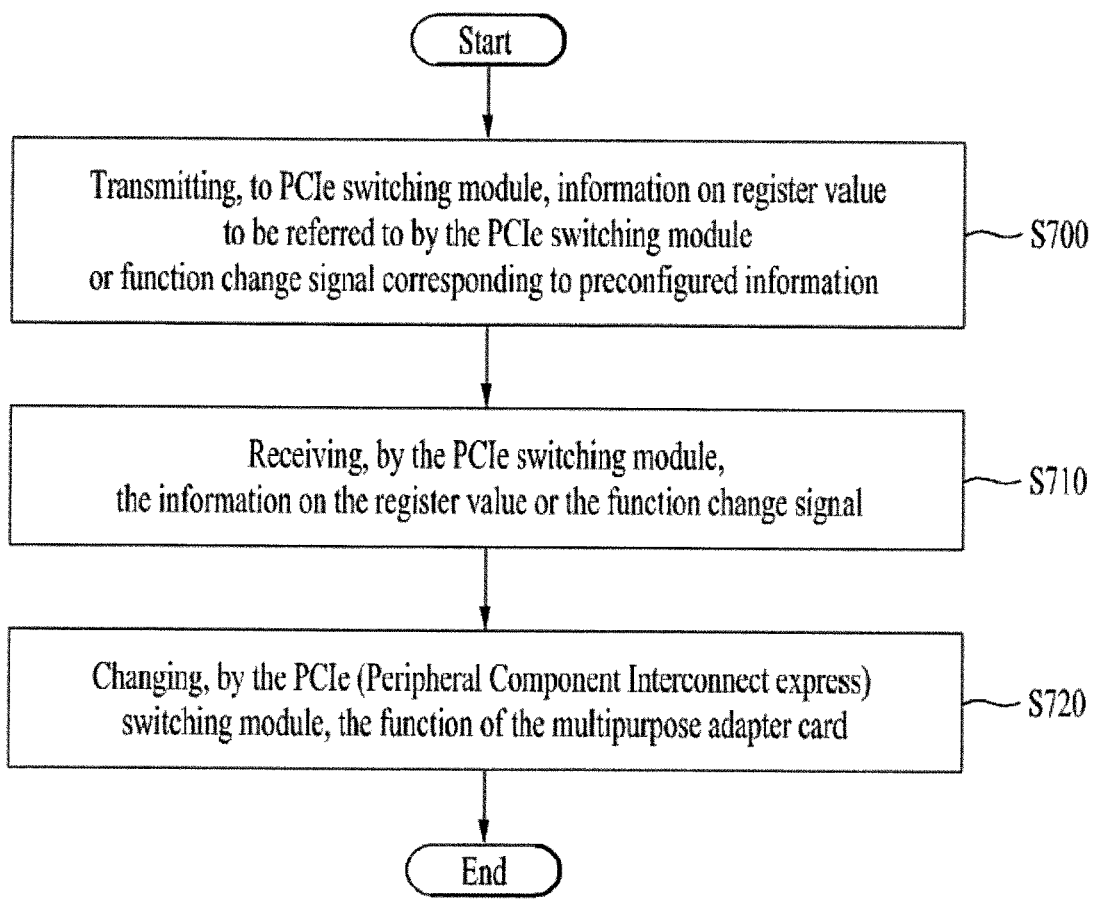
FIG. 7 illustrates an embodiment of an integration method for a multipurpose adapter card according to the present invention.

FIG. 7 illustrates an embodiment of an integration method for a multipurpose adapter card according to the present invention.

Referring to FIG. 7, the multi-purpose adapter card integration method may include transmitting, to a PCIe switching module, information on a register value to be referred to by the PCIe switching module or a function change signal corresponding to preconfigured information (S700), receiving, by the PCIe switching module, the information on the register value or the function change signal (S710), or changing, by the PCIe (Peripheral Component Interconnect express) switching module, the function of the multipurpose adapter card (S720).

In addition, the first function setting module or the second function setting module may perform step S700 of transmitting, to the PCIe switching module, information on a register value to be referred to by the PCIe switching module or a function change signal corresponding to preconfigured information. A detailed description thereof has been given above with reference to FIGS. 1 to 6. The PCIe switching module may perform step S710 of receiving the information on the register value or the function change signal. A detailed description thereof has been given above with reference to FIGS. 1 to 6. In addition, the PCIe (Peripheral Component Interconnect express) switching module may perform step S720 of changing the function of the multi-purpose adapter card (S720). A detailed description thereof has been given above with reference to FIGS. 1 to 6.

The embodiments disclosed in the specification of the present invention are not intended to limit the present invention. The scope of the invention should be determined by the appended claims and their legal equivalents, not by the above description, and all changes coming within the meaning and equivalency range of the appended claims are intended to be embraced therein.

MODE FOR INVENTION

Various embodiments have been described in the best mode for carrying out the invention.

INDUSTRIAL APPLICABILITY

The present invention is used in the field of multipurpose adapter cards.

It will be apparent to those skilled in the art that various modifications and variations can be made in the present invention without departing from the spirit or scope of the invention. Accordingly, it is intended that the present invention cover the modifications and variations of this invention provided they come within the scope of the appended claims and their equivalents.

The invention claimed is:

1. A multipurpose adapter card comprising:
   a peripheral component interconnect express (PCIe) switching module configured to set a function of the multipurpose adapter card to one of a first function and a second function, wherein the first function is a function of connection between a host and a device, and the second function is a function of connection between a plurality of hosts;
   a first function setting module configured to transmit a register value to be referred to by the PCIe switching module to the PCIe switching module;
   a second function setting module configured to transmit a function change signal corresponding to preconfigured information to the PCIe switching module; and
   a clock information module configured to selectively perform one of generation of first clock information and reception of second clock information,
   wherein the clock information module transmits the first clock information to the PCIe switching module in response to the first function, and transmits the second clock information to the PCIe switching module in response to the second function,
   wherein the register value and the preconfigured information are information related to the function of the multipurpose adapter card,
   wherein the PCIe switching module changes the function of the multipurpose adapter card based on the register value or the function change signal.

2. The multipurpose adapter card according to claim 1, wherein the PCIe switching module selectively receives the register value or the function change signal.

3. The multipurpose adapter card according to claim 1, further comprising:
   a reset information module configured to selectively perform one of generation of first reset information and reception of second reset information.

4. The multipurpose adapter card according to claim 3, wherein the reset information module transmits the first reset information to the PCIe switching module in response to the first function, and transmits the second reset information to the PCIe switching module in response to the second function.

5. The multipurpose adapter card according to claim 3, further comprising:
   a first adapter card;
   a second adapter card; and
   an optical module configured to connect the first adapter card and the second adapter card.

6. A method for integrating a multipurpose adapter card, the method comprising:
   transmitting, to a peripheral component interconnect express (PCIe) switching module, a register value to be referred to by the PCIe switching module or a function change signal corresponding to preconfigured information;
   receiving, by the PCIe switching module, the register value or the function change signal;
   selectively performing, by a clock information module, one of generation of first clock information and reception of second clock information; and
   setting, by the PCIe switching module, a function of the multipurpose adapter card to one of a first function and a second function,
   wherein the first function is a function of connection between a host and a device, and the second function is a function of connection between a plurality of hosts,
   wherein the function of the multipurpose adapter card is extended connection between a host and an external device or connection between the plurality of hosts,
   wherein the clock information module transmits the first clock information to the PCIe switching module in response to the first function, and transmits the second clock information to the PCIe switching module in response to the second function,
   wherein the register value and the preconfigured information are information related to the function of the multipurpose adapter card,
   wherein the PCIe switching module changes the function of the multipurpose adapter card based on the register value or the function change signal.

7. The method according to claim 6, wherein the PCIe switching module selectively receives the register value or the function change signal.

8. The method according to claim 6, further comprising:
   selectively performing, by a reset information module, one of generation of first reset information and reception of second reset information.

9. The method according to claim 8, wherein the reset information module transmits the first reset information to the PCIe switching module in response to the first function, and transmits the second reset information to the PCIe switching module in response to the second function.

10. The method according to claim 8, wherein the multipurpose adapter card comprises a first adapter card and a second adapter card,
    the method further comprising:
    connecting, by an optical module, the first adapter card and the second adapter card.

* * * * *